US009829071B2

(12) United States Patent
Nakamura et al.

(10) Patent No.: US 9,829,071 B2
(45) Date of Patent: Nov. 28, 2017

(54) WOBBLE REMOVAL SHAFT COUPLING AND HYPOCYCLOID REDUCTION GEAR DEVICE USING SAME

(71) Applicant: HONDA MOTOR CO., LTD., Tokyo (JP)

(72) Inventors: Kimiaki Nakamura, Wako (JP); Yoshihiko Higashidani, Wako (JP); Koji Ueda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 14/851,318

(22) Filed: Sep. 11, 2015

(65) Prior Publication Data
US 2016/0076623 A1     Mar. 17, 2016

(30) Foreign Application Priority Data

Sep. 16, 2014   (JP) .................................. 2014-187571

(51) Int. Cl.
| | |
|---|---|
| *F16H 1/32* | (2006.01) |
| *F16H 55/16* | (2006.01) |
| *F16H 55/17* | (2006.01) |

(52) U.S. Cl.
CPC ............... *F16H 1/32* (2013.01); *F16H 55/16* (2013.01); *F16H 2001/323* (2013.01);
(Continued)

(58) Field of Classification Search
None
See application file for complete search history.

(56) References Cited

U.S. PATENT DOCUMENTS 3,719,103 A * 3/1973 Streander ................ F16H 55/18
 74/440
8,904,894 B2 * 12/2014 Geiser ..................... F16H 55/16
 368/38

(Continued)

FOREIGN PATENT DOCUMENTS

| FR | 3001518 A1 * | 8/2014 | ............... F16H 1/32 |
|---|---|---|---|
| JP | 2007-024072 | 2/2007 | |
| JP | 2010-144554 | 7/2010 | |

OTHER PUBLICATIONS

Baranger, C.P., Device for Suppressing Positional Deviation in a Reduction Gear Having an Orbital Wheel, Aug. 7, 2014, English Translation of WO2014118446.*

(Continued)

*Primary Examiner* — Huan Le
*Assistant Examiner* — Lori Wu
(74) *Attorney, Agent, or Firm* — Rankin, Hill & Clark LLP

(57) ABSTRACT

In a wobble removal shaft coupling device including a wobble removal gear having an internal gear with a first central axial line and an external gear meshing with the wobble removal gear and having a second central axial line. The first and second central axial lines are in parallel with and offset from each other, and the external gear teeth are identical in number to the internal gear teeth of the wobble removal gear. At least one of the two sets of the gear teeth are resiliently deformable in a circumferential and/or radial direction so as to allow the two gears to be meshing with each other while permitting an eccentric wobbling movement of the external gear relative to the internal gear without requiring a play or a sliding engagement. The wobble removal shaft coupling device can be incorporated in a hypocycloid reduction gear device.

14 Claims, 17 Drawing Sheets

(52) U.S. Cl.
CPC .. *F16H 2001/324* (2013.01); *F16H 2001/327* (2013.01); *F16H 2055/176* (2013.01)

(56) References Cited

U.S. PATENT DOCUMENTS

| | | | | |
|---|---|---|---|---|
| 2007/0180943 A1* | 8/2007 | Daout | ............... | F16H 55/16 74/457 |
| 2011/0079098 A1* | 4/2011 | Nowicki | ............... | F16H 55/16 74/411 |
| 2011/0203397 A1* | 8/2011 | Bishop | ............... | F16H 55/18 74/437 |
| 2012/0258835 A1* | 10/2012 | Kataoka | ............... | F16H 55/18 475/178 |
| 2013/0045827 A1* | 2/2013 | Kobayashi | ............... | F16H 1/32 475/149 |
| 2013/0160589 A1* | 6/2013 | Mittermair | ............... | F16H 55/06 74/409 |
| 2013/0333504 A1* | 12/2013 | Klinger | ............... | F16H 55/16 74/409 |
| 2014/0224064 A1* | 8/2014 | Tesar | ............... | H02K 7/116 74/606 R |
| 2016/0053871 A1* | 2/2016 | Fecko | ............... | F16H 3/70 475/168 |

OTHER PUBLICATIONS

Japanese Office Action dated Sep. 5, 2017, partial English translation included, 7 pages.

* cited by examiner

WOBBLE REMOVAL SHAFT COUPLING AND HYPOCYCLOID REDUCTION GEAR DEVICE USING SAME

TECHNICAL FIELD

The present invention relates to a wobble removal shaft coupling and a hypocycloid reduction gear device using the same. In particular, the present invention relates to the technology for accommodating wobbles between two parts while accurately transmitting rotational movement between the two parts.

BACKGROUND ART

A known hypocycloid reduction gear device includes an internal gear (ring gear) having internal teeth formed on the inner periphery thereof, an external gear (planetary gear) having external teeth on the outer periphery thereof meshing with the internal teeth and an eccentric drive member rotatably supported by a fixed member in a coaxial relationship to the internal gear and rotatably supporting the external gear such that the external gear rolls over the inner periphery of the internal gear while maintaining the meshing between the internal teeth and the external teeth. The external gear has a fewer number of gear teeth than the internal gear. See JP2007-24072A, for instance. When the external gear has gear teeth that are only one less than the internal gear, a maximum reduction ratio can be achieved.

In such a hypocycloid reduction gear device, because the external gear is caused to wobble while rolling over the inner periphery of the internal gear owing to the action of the eccentric drive member, a certain coupling is required between the external gear and the fixed member in order to accommodate the wobbling motion of the external gear while the external gear and the fixed member are kept rotationally fast to each other. Therefore, a relatively complex shaft coupling such as an Oldham coupling is required for this purpose in order to minimize wears and noises. In the prior art disclosed in JP2007-24072A, in order to accommodate the wobbling motion of the external gear, a plurality of roller pins extending axially from a fixed member are received in respective circular holes provided in the external gear.

In particular, for use as the reduction gear devices in the actuators of robots, the known devices are considered to be inadequate in terms of durability, noise level and compactness.

In view of such problems of the prior art, a primary object of the present invention is to provide a wobble removal shaft coupling that is highly durable, capable of quiet operation and highly compact.

A second object of the present invention is to provide a hypocycloid reduction gear device incorporated with such a wobble removal shaft coupling.

The present invention accomplishes such an object by providing a wobble removal shaft coupling, comprising: a wobble removal gear (52) comprising an internal gear having a set of internal gear teeth (60) along an inner circumference thereof, and having a first central axial line; and an external gear (18) meshing with the wobble removal gear via a set of external gear teeth (16) and having a second central axial line, the first and second central axial lines being in parallel with and offset from each other, and the external gear teeth (16) being identical in number to the internal gear teeth (60) of the wobble removal gear; wherein at least one of the two sets of the gear teeth are resiliently deformable in a circumferential and/or radial direction.

The resiliently deformable gear teeth cause the external gear to be rotationally fast with the wobble removal gear (although the external gear rolls over the inner periphery of the wobble removal gear) while permitting the wobbling motion of the external gear relative to the wobble removal gear without involving a play or a sliding engagement.

The resiliently deformable set of gear teeth (60) may be formed by laminating a plurality of laminates (53) so that the manufacturing cost can be minimized and the manufacturing process can be simplified.

To enhance the resiliency or compliance of the resiliently deformable gear teeth, the resiliently deformable gear teeth (60) may be separated from one another by a radial slit (56) having a greater length than an effective height of the resiliently deformable gear teeth.

To even further enhance the resiliency or compliance of the resiliently deformable gear teeth, each of the resiliently deformable gear teeth may be provided with a central radial slot (63, 65) extending radially in a base end portion thereof.

The central radial slot (65) may extend through a free end portion of the corresponding resiliently deformable gear tooth (60) such that the resiliently deformable gear tooth is formed as a bifurcated tooth.

According to a preferred embodiment of the present invention, the gear provided with the resiliently deformable set of gear teeth (60) is provided with a plurality of mounting pieces (62) each formed by partly omitting the slits and truncating the corresponding gear teeth and having a mounting hole (57) formed therein. Thereby, the mounting hole may be formed without unduly increasing the diameter of the corresponding gear. The omission of the slits and the truncation of the affected gear teeth should be performed such that a proper meshing between the wobble removal gear and the external gear can be maintained.

To enhance the resiliency or compliance of the resiliently deformable gear teeth while optimizing the stress distribution in each resiliently deformable gear tooth, the resiliently deformable gear tooth (60) may be provided with a free end portion configured as an effective gear tooth and a base portion which is substantially narrower than the free end portion.

According to another embodiment of the present invention, each resiliently deformable gear tooth (60) includes a curved support piece extending between an effective gear tooth and a gear main body so that the resiliency or compliance of the resiliently deformable gear teeth can be enhanced. For instance, each curved support piece may meander in the radial direction as it extends radially.

To positively define the limit of the range of deformation of each resiliently deformable gear tooth, the gear tooth (60) may be provided with a circumferential extension (67) opposing an adjacent gear tooth or a similar circumferential extension at a small gap.

The present invention also provides a wobble removal shaft coupling (70) comprising: an inner wheel (72); an outer wheel (74) disposed substantially concentric to the inner wheel (72); and a resilient member (76) connecting the inner wheel (72) and the outer wheel (74) to each other so as to be resiliently moveable in a circumferential and/or radial direction relative to each other; wherein the resilient member (76, 100, 102, 130) includes a support piece extending between the inner wheel and the outer wheel in a circumferentially meandering fashion or in a spirally curved fashion.

To positively define the limit of the range of deformation of each resiliently deformable gear tooth, the inner wheel (72) and the outer wheel (74) may be provided with abutting portions (82, 88) that limit relative movement between the inner wheel and the outer wheel beyond a prescribed limit.

The inner wheel, the outer wheel and the resilient member may be formed by laminating a plurality of laminates (53) each integrally provided with parts corresponding to the inner wheel, the outer wheel and the resilient member so that the manufacturing cost can be minimized and the manufacturing process can be simplified.

The present invention also provides a hypocycloid reduction gear device comprising: a base member (40); an internal gear (14) having internal gear teeth (12) along an inner circumference thereof, and supported by the base member so as to be rotatable around a first rotational center line; an external gear (18) having external gear teeth (16) along an outer circumference thereof, the external gear teeth meshing with the internal gear teeth, and the external gear teeth being smaller in number than the internal gear teeth; an eccentric drive member (24) rotatably supported by the base member so as to be rotatable around the first rotational center line, and rotatably supporting the external gear so as to be rotatable around a second rotational center line extending in parallel with and offset from the first rotational center line and roll over the inner circumference of the internal gear; and a wobble removal shaft coupling (50, 70) for resiliently coupling the external gear with the base member so as to maintain the external gear rotatively fixed relative to the base member while permitting an eccentric wobbling movement of the external gear relative to the base member.

In a typical application, the base member may consist of a fixed member.

The resiliently deformable gear teeth cause the external gear to be rotationally fast with the wobble removal gear (although the external gear rolls over the inner periphery of the wobble removal gear) while permitting the wobbling motion of the external gear relative to the wobble removal gear without involving a play or a sliding engagement. Furthermore, the meshing between the external gear teeth and the internal gear teeth can achieve a high speed reduction ratio.

According to a certain aspect of the present invention, the wobble removal shaft coupling (50) comprises a wobble removal gear (52) having a set of wobble removal internal gear teeth (60) along an inner circumference thereof and fixedly attached to the base member in a substantially concentric relationship to the internal gear (14), the wobble removal internal gear teeth (60) meshing with the set of the external gear teeth (16), and the external gear teeth being identical in number to the wobble removal internal gear teeth of the wobble removal gear; wherein at least one of the two sets of the gear teeth are resiliently deformable in a circumferential and/or radial direction.

According to another aspect of the present invention, the wobble removal shaft coupling (70) comprises: an inner wheel (72) fixedly attached to the external gear (18); an outer wheel (74) disposed substantially concentric to the inner wheel and fixedly attached to the base member; and a resilient member (76, 100, 102, 130) connecting the inner wheel and the outer wheel to each other so as to be resiliently moveable in a circumferential and/or radial direction relative to each other; wherein the resilient member includes a support piece extending between the inner wheel and the outer wheel in a circumferentially meandering fashion or in a spirally curved fashion.

DESCRIPTION OF THE PREFERRED EMBODIMENT(S)

A first embodiment of the wobble removal shaft coupling and the hypocycloid reduction gear device is described in the following with reference to FIGS. 1 to 4.

Figure 1:
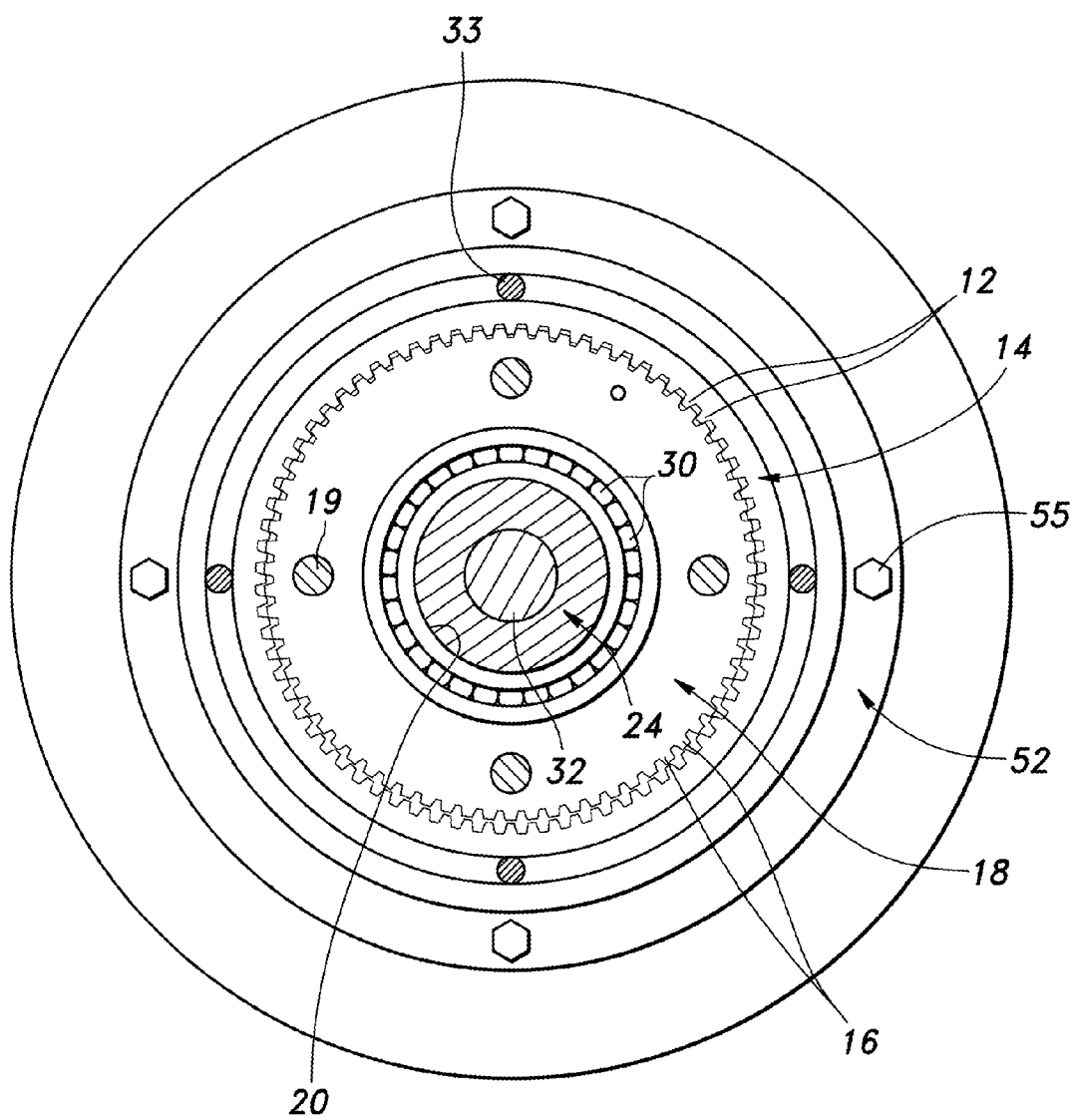
FIG. 1 is a sectional front view of a hypocycloid reduction gear device embodying the present invention.
Figure 2:
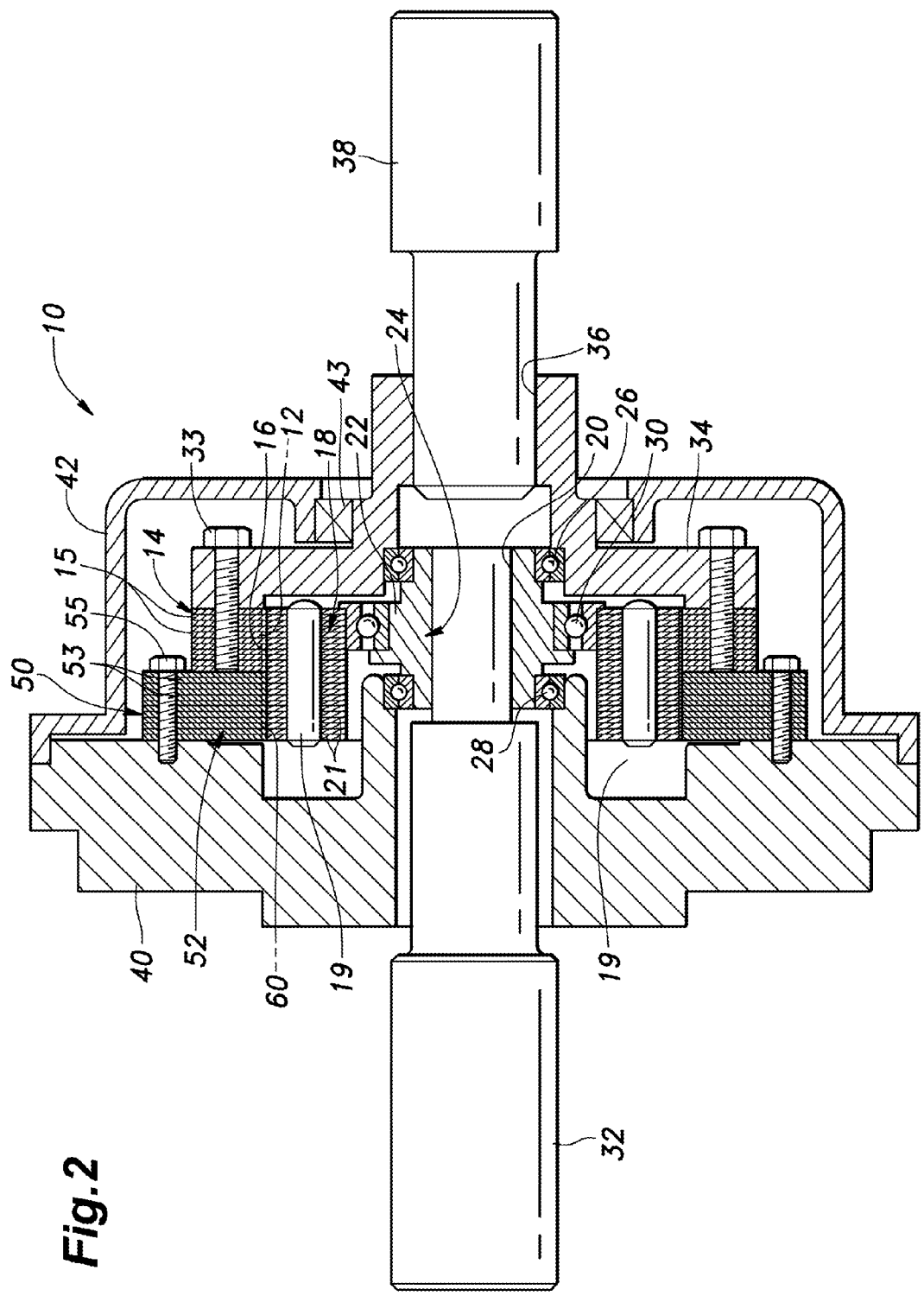
FIG. 2 is a sectional side view of the hypocycloid reduction gear device.

The hypocycloid reduction gear device 10 shown in FIGS. 1 and 2 includes an annular internal gear (ring gear) 14 having a plurality of internal gear teeth 12 formed on the inner periphery thereof, and an annular external gear (planetary gear) 18 having a plurality of external gear teeth 16 formed on the outer periphery thereof. The internal gear teeth 12 and the external gear teeth 16 have a same pitch, but the external gear teeth 16 are fewer in number, typically but not exclusively by one, than the internal gear teeth 12.

The hypocycloid reduction gear device 10 further includes an eccentric drive member 24 having an eccentric portion 22 integrally formed therein in an eccentric relationship to a central bore 20 thereof. The eccentric drive member 24 is rotatably supported by an output member 34 and a fixed member 40 which will be described hereinafter via ball bearings 26 and 28, respectively, at either axial ends thereof such that the central bore 20 is disposed concentric to the internal gear 14. As a result, the eccentric drive member 24 rotates around a same rotational center line as the internal gear 14.

The central bore 20 of the eccentric drive member 24 fixedly receives an end of an input shaft 32, and the outer circumferential surface of the eccentric portion 22 rotatably supports the external gear 18 via a bearing 30 typically consisting of a ball bearing. The eccentricity of the eccentric portion 22 is determined by the tooth heights of the internal gear 14 and the external gear 18, and the internal gear 14 and the external gear 18 mesh with each other only in one part of the entire circumference.

The eccentric drive member 24 is rotatively driven by the input shaft 32 around the same rotational center line as the internal gear 14. The rotation of the eccentric drive member 24 causes the external gear 18 to roll on the internal gear 14 while meshing with each other only in one part thereof so that the external gear 18 eccentrically rolls over the inner periphery of the internal gear 14 or wobbles relative to the internal gear 14.

The output member 34 is fixedly attached to the internal gear 14 by mounting bolts 33 in a coaxial relationship. An end of an output shaft 38 is fixedly fitted into a central bore 36 of the output member 34. Thus, the input shaft 32, the internal gear 14, the output member 34 and the output shaft 38 are disposed all in a coaxial relationship.

Figure 3:
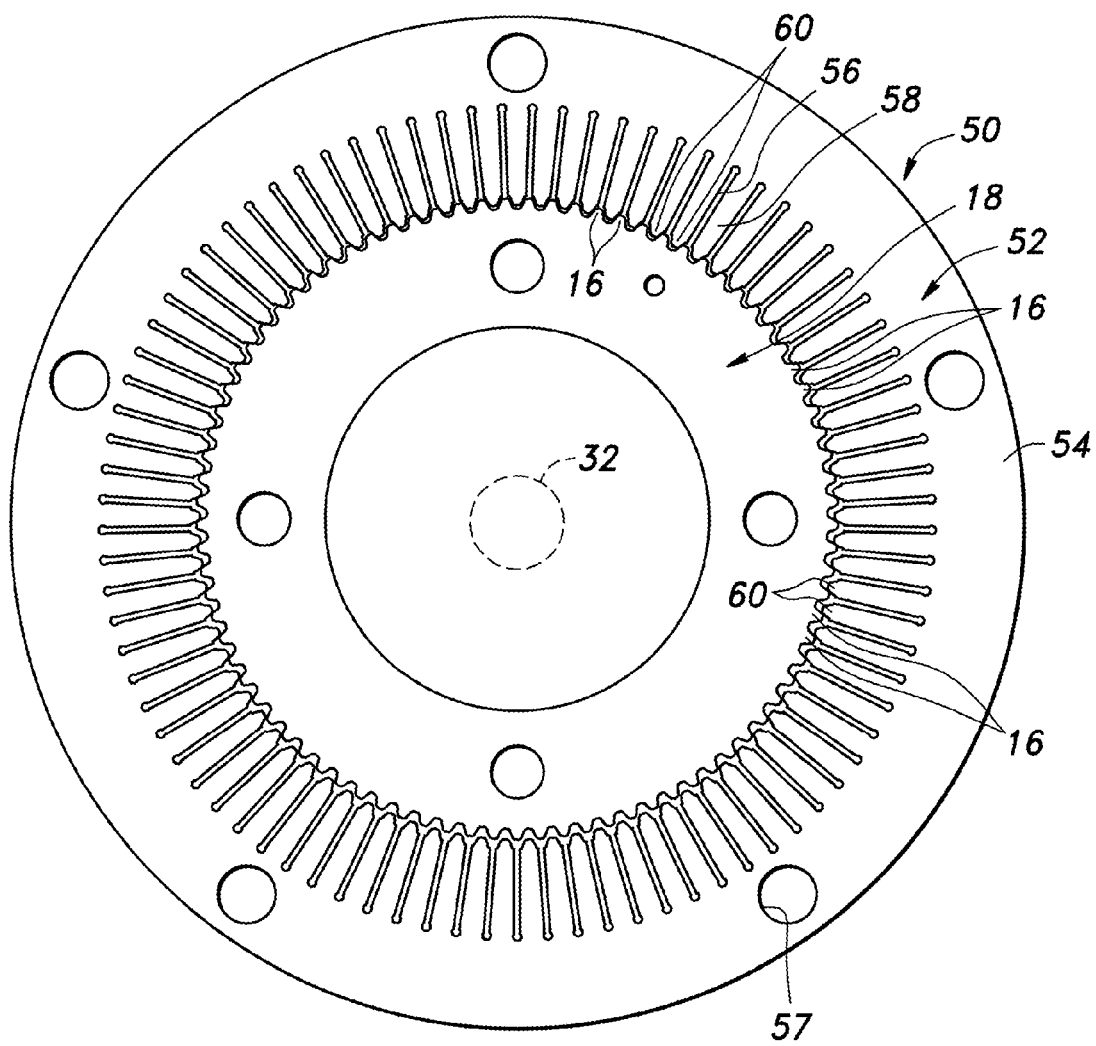
FIG. 3 is a front view of a wobble removal shaft coupling incorporated in the hypocycloid reduction gear device.

The external gear 18 is coupled to the fixed member 40 via a wobble removal shaft coupling 50. As shown in FIGS. 2 and 3, the wobble removal shaft coupling 50 is provided with a wobble removal gear 52 consisting of an internal gear that meshes with the external gear 18 or an axial extension of the external gear 18, the extension consisting of an external gear conformal to the external gear 18. The internal teeth 60 of the wobble removal gear 52 are same in number as the external teeth 16 of the external gear 18 (or the extension thereof). The wobble removal gear 52 is not in contact with the internal gear 14, and hence does not obstruct the rotation of the internal gear 14.

Thus, the external gear 18 or the axial extension thereof meshes with the wobble removal gear 52 such that the angular phase relationship between these two parts are maintained while the external gear 18 undergoes a wobbling motion relative to the wobble removal gear 52. This wobbling motion is synchronized with the rotational motion of the input shaft 32. In other words, the external gear 18 wobbles at the same rate as the rotational speed of the input shaft 32 while remaining at a fixed rotational angle (or maintains a translational wobbling motion in synchronism with the rotation of the input shaft 32) owing to the meshing with the wobble removal gear 52.

The wobble removal gear 52 includes an annular gear main body 54 provided with a plurality of mounting hole 57 arranged at a regular angular interval, a plurality of cantilever support pieces 58 arranged at a regular angular interval and extending radially inward from the inner periphery of the gear main body 54 defining a radial gap or slit 56 between each pair of adjoining support pieces 58 and internal teeth 60 formed at the respective tips (free ends) of the support pieces 58. The term "slit" as used herein may include any radial cut separating each pair of adjoining internal teeth 60, and may have any length and width that are required to achieve the required compliance of the internal teeth 60. Preferably, each slit 56 has a length greater than the effective height of the internal teeth 60, or extends beyond the bottom of the valley that should be normally defined between the effective parts of the adjoining pair of internal teeth 60. The wobble removal gear 52 is fixedly attached to an end surface of the fixed member 40 in a coaxial relationship to the internal gear 14 by mounting bolts 55 passed through the mounting holes 57.

Figure 4:
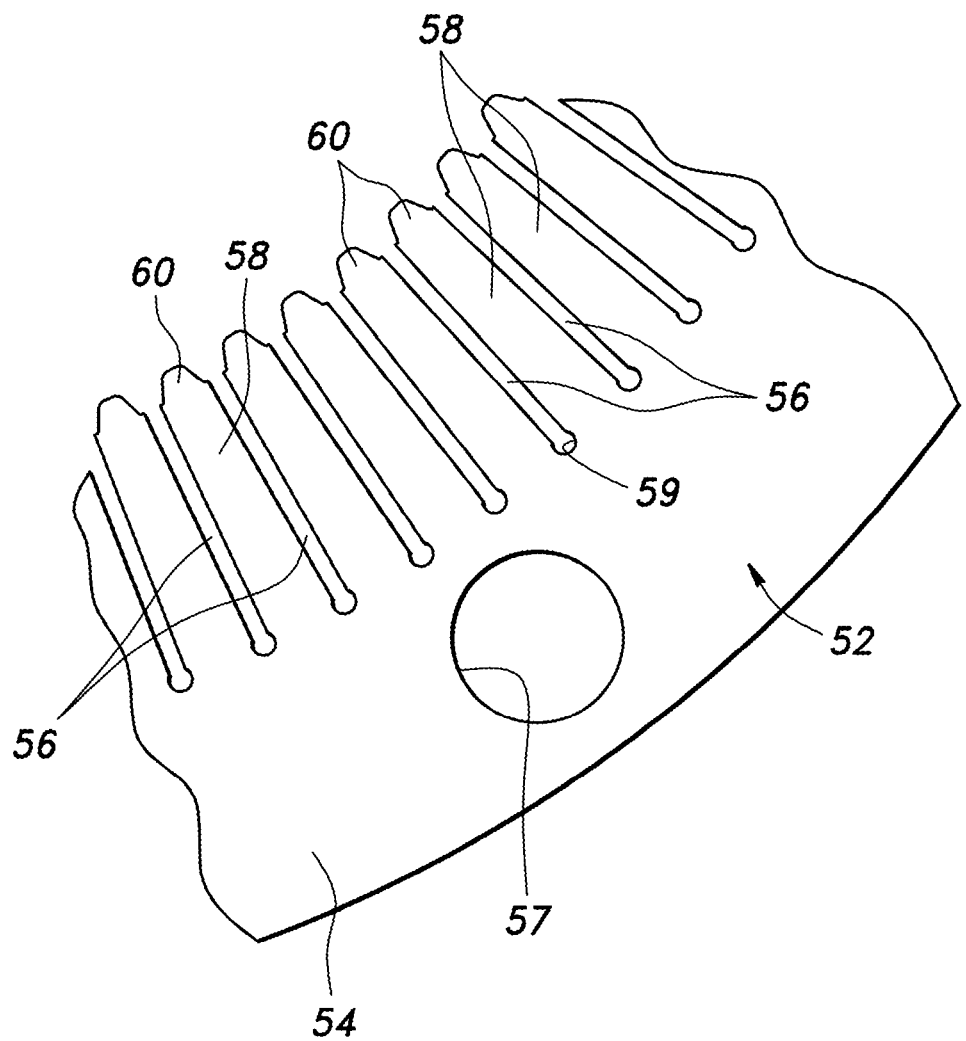
FIG. 4 is a fragmentary sectional view of a wobble removal gear of the wobble removal shaft coupling.

The internal teeth 60 of the wobble removal gear 52 are enabled to deflect in the circumferential direction under the elastic deformation of the support pieces 58. The internal teeth 60 mesh with the external teeth 16 only in one part of the entire circumference thereof. The circumferential deflection of each internal tooth 60 is limited by the abutment to the adjoining internal tooth 60 such that each internal tooth 60 deflects under a relatively small loading while the internal tooth is spaced from the adjoining tooth or the slit 56 is not fully closed, and once the internal tooth 60 abuts the adjoining internal tooth 60, any further deflection is substantially prevented. In particular, each internal tooth 60 is able to deflect circumferentially owing to the elastic deformation of the corresponding support piece 58 to an extent required to accommodate the eccentric wobbling movement of the external gear 18 as the eccentric drive member 24 rotates. The base end of each slit 56 terminates in a circular cutout 59 wider than the slit 56 (instead of being simply rounded) as shown in FIG. 4 to avoid stress concentration in the base end portion of each support piece 58.

The meshing between the internal teeth 60 that can resiliently deflect in the circumferential direction and the external teeth 16 allows the eccentric drive member 24 to be connected to the fixed member 40 in a fixed rotational angular relationship as the eccentric drive member 24 rotates while permitting the wobbling motion of the eccentric drive member 24 relative to the fixed member 40.

Because the internal teeth 60 and the external teeth 16 are identical in number, even though the internal teeth 60 and the external teeth 16 are identically configured, due to a slight difference in the pitch between the internal teeth 60 and the external teeth 16, a certain interference is unavoidable in the meshing between the internal teeth 60 and the external teeth 16. However, this interference is eliminated by the elastic deflection of the internal teeth 60 in the circumferential direction.

As the eccentric drive member 24 rotates by being driven by the input shaft 32, the external gear 18 wobbles without rotating owing to the meshing with the wobble removal gear 52. The external gear 18 also meshes with the internal gear 14. Because the external gear 18 has fewer teeth than the internal gear 14, the internal gear 14 rotates by a smaller rotational angle than the input shaft 32.

If the number of teeth of the external gear 18 is Ne, and the number of teeth of the internal gear 14 is Ni, the output shaft 38 rotates (Ni−Ne) turns as the input shaft 32 rotates Ne turns (or as the external gear 18 undergoes Ne cycles of wobbling motion). In other words, a reduction ratio of Ne/(Ni−Ne) is achieved. If Ni−Ne=1, the reduction ratio is Ne/1.

Thus, the external gear 18 is coupled to the fixed member 40 via the wobble removal shaft coupling 50 such that the wobbling of the external gear 18 and the rotation of the input shaft 32 are accurately rotatively synchronized without requiring a complex coupling mechanism such as an Oldham coupling. As the wobble removal shaft coupling 50 relies on the resiliency of the gear teeth for the operation thereof, and does not require any sliding parts or involve any play, a high durability and a quiet operation can be ensured. Also, the present invention provides a compact and economical solution.

In the illustrated embodiment, the wobble removal gear 52 is formed by laminating a plurality of laminates 53 which are produced from sheet metal by punching, and joining the laminates 53 by using the mounting bolts 55 that attach the laminates 53 (wobble removal gear 52) to the fixed member 40. Therefore, the wobble removal shaft coupling 50 can be fabricated more efficiently and economically than by fabricating the wobble removal gear 52 by machining.

The rotating parts of the hypocycloid reduction gear device 10 and the wobble removal shaft coupling 50 are covered by an outer cover 42 without interference, the outer cover 42 being attached to the fixed member 40. The outer cover 42 is also supported by the output member 34 via a bearing 43 such that the outer cover 42 and the output member 34 are rotatable relative to each other.

In the illustrated embodiment, the internal gear 14 and the external gear 18 are fabricated by laminating a plurality of gear laminates 15 and 21, respectively, which are punched out from sheet metal. These laminates 15 and 21 are integrally joined to one another by mounting bolts 33 and pins 19, respectively, and this arrangement allows these gears to be fabricated at low costs. The laminates 15 and 21 may also be joined to one another by other means such as crimping, welding and bonding.

Figure 5:
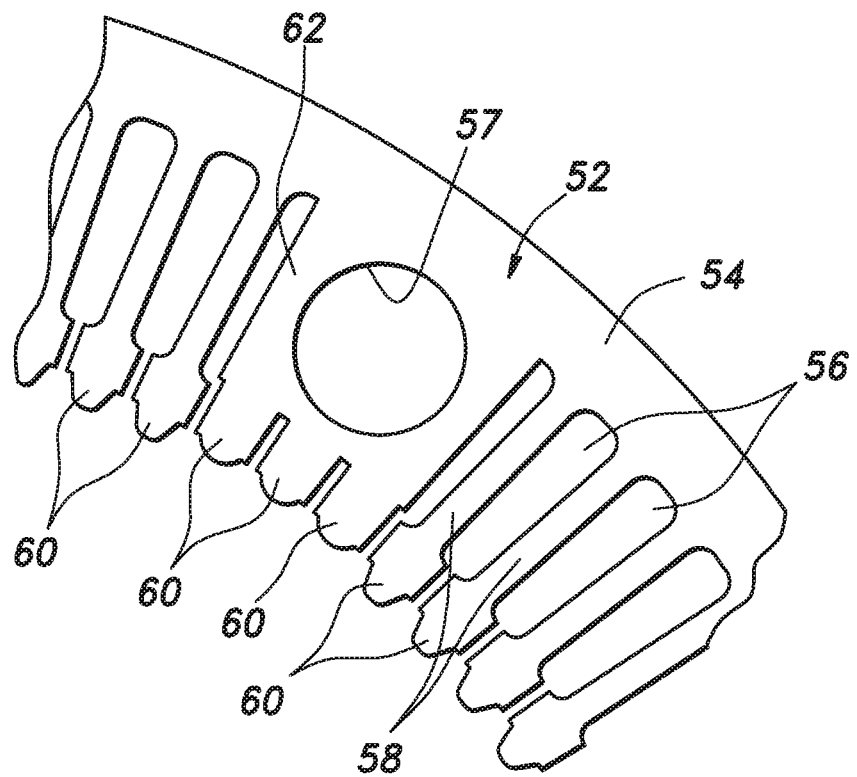
FIG. 5 is a view similar to FIG. 4 showing an alternate embodiment of the wobble removal gear.

FIG. 5 shows another embodiment of the wobble removal gear 52. In this embodiment, each support piece 58 is narrower than the associated internal tooth 60. Furthermore, in the part of the wobble removal gear 52 adjoining each mounting hole 57, a plurality (three in this embodiment) of the support pieces 58 are merged into a single mounting piece 62 for forming the mounting hole 57 therein. Such mounting pieces 62 are provided at a regular angular interval by a number corresponding to the required number of the mounting holes 57.

In this case also, the internal teeth 60 are configured to be resiliently deformable in the circumferential direction, and become stiffer as soon as the corresponding internal tooth 60 abuts the adjoining internal tooth 60. Thus, a reliable meshing can be ensured while accommodating the wobbling movement of the external gear 18 relative to the wobble removal gear 52. In this case, the base end of each slit 56 is rounded at the corner portions thereof so that undesired concentration of stress in the base end of the corresponding support piece 58 may be avoided.

Each and every one of the internal teeth 60 of the wobble removal gear 52 is not required to be configured to mesh with the external teeth 16 of the external gear 18, but some of the internal teeth 60 may be omitted without jeopardizing the synchronism between the wobbling movement of the external gear 18 and the rotational movement of the input shaft 32 (or the eccentric drive member 24).

In this embodiment, the internal teeth 60 formed in each mounting piece 62 are truncated so that the meshing interference between the internal teeth 60 and the external teeth of the external gear may be avoided even though the resiliency of the internal teeth 60 of the mounting piece 62 is limited. The omission of the slits and the truncation of the affected gear teeth should be performed such that a proper meshing between the wobble removal gear and the external gear can be maintained.

Figure 6:
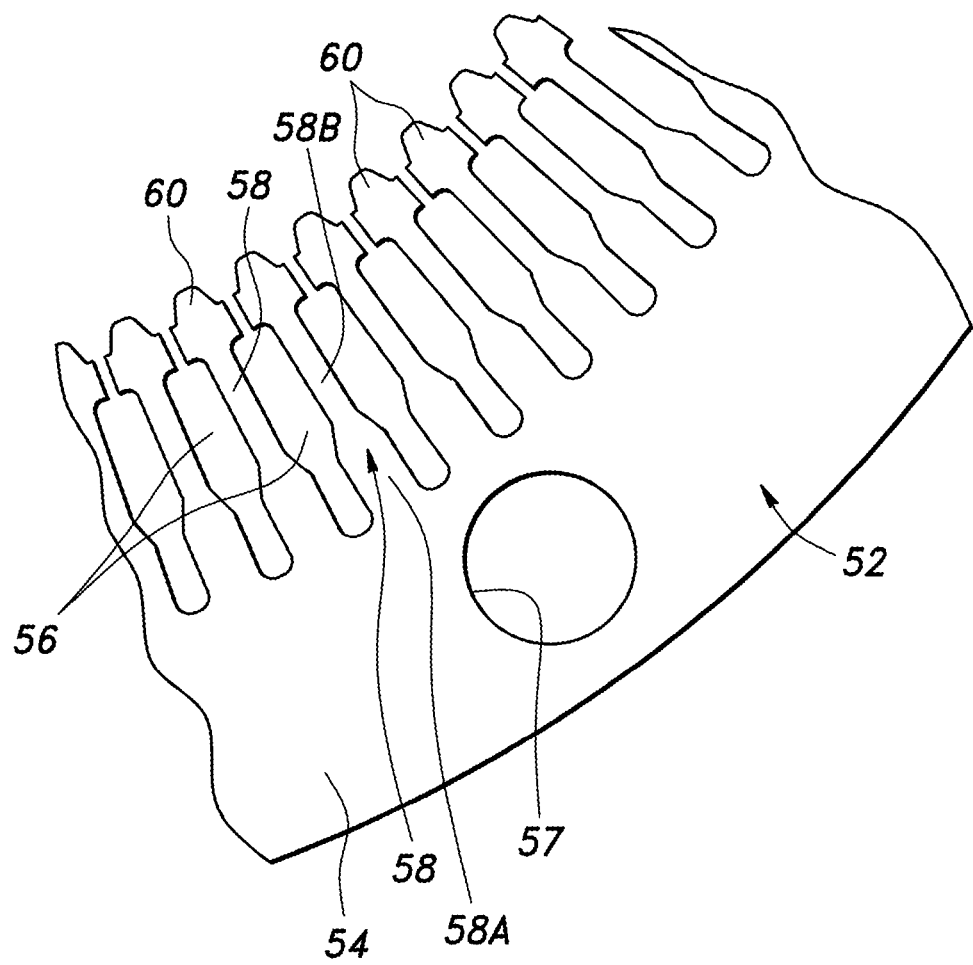
FIG. 6 is a view similar to FIG. 4 showing another alternate embodiment of the wobble removal gear.

A possible variation of the mounting piece 62 is illustrated in FIG. 6. In this embodiment, each support piece 58 includes a wide section 58A in the base end portion thereof and a narrow section 58B extending between the wide section 58A and the internal tooth 60. The narrow section 58B contributes to a high compliance of the internal tooth 60, and the wide section 58A ensures a high mechanical strength of the support piece 58 under bending deformation. In this case also, the internal teeth 60 are separated by a narrow gap from one another, and hence demonstrate a high compliance until the adjoining internal teeth 60 abut one another, causing the stiffness of the support pieces 58 to sharply increase.

Figure 7:
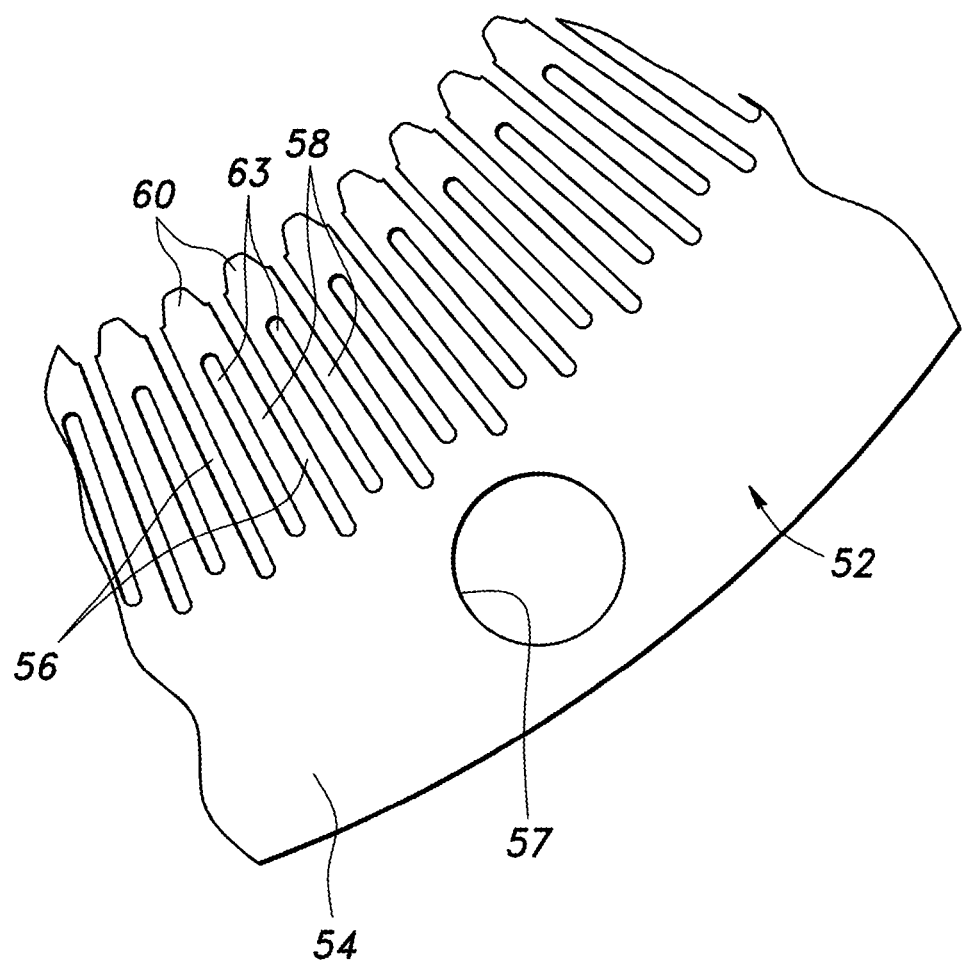
FIG. 7 is a view similar to FIG. 4 showing yet another alternate embodiment of the wobble removal gear.

In the embodiment illustrated in FIG. 7, each support piece 58 is provided with a central slot 63 extending in the radial direction. In this case, each slot 63 extends short of the internal tooth 60 and the base end of the adjoining slit 56. The central slot 63 increases the compliance of the support piece 58 while minimizing concentration of stress in the base end of the support piece 58.

Figure 8:
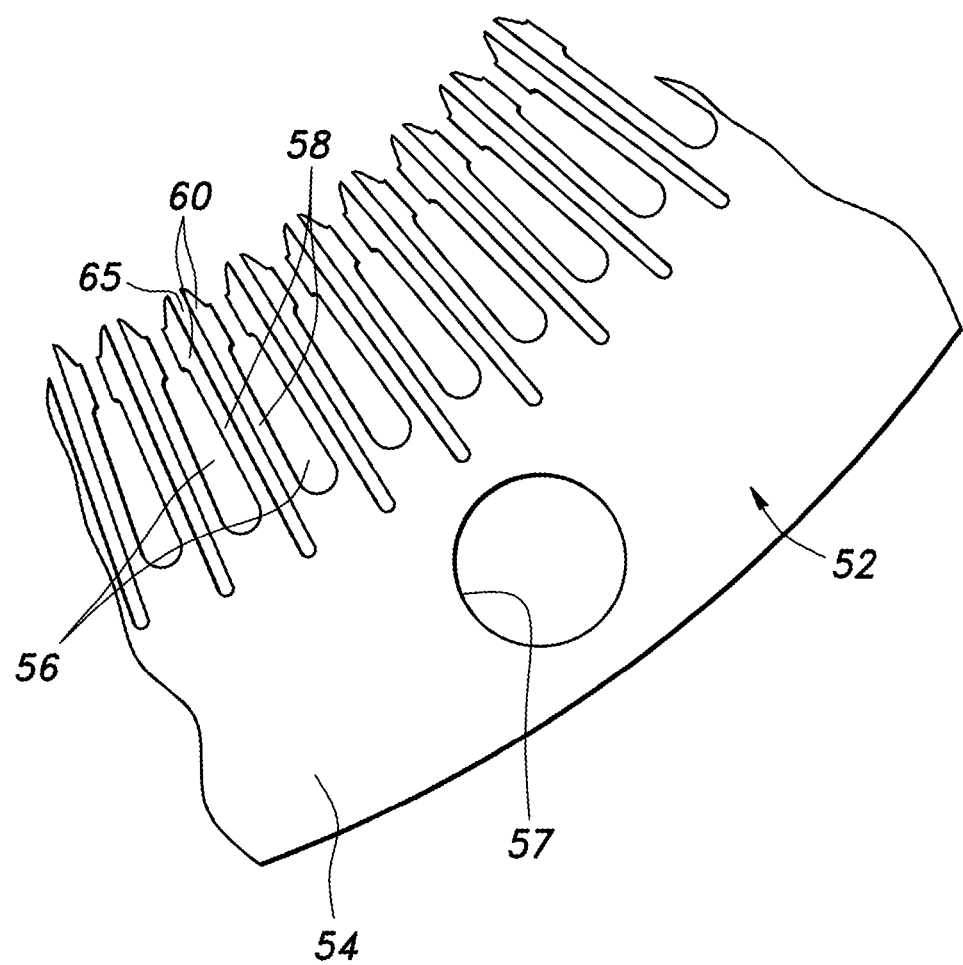
FIG. 8 is a view similar to FIG. 4 showing yet another alternate embodiment of the wobble removal gear.

In the embodiment illustrated in FIG. 8, a central radial slot 65 extends through each internal tooth 60, thereby splitting the internal tooth 60 and the support piece 58 into two equal parts in each case. Thus, each internal tooth 60 is bifurcated in the free end portion thereof. The base end of the radial slot 65 extends slightly beyond the base end of the adjoining slit 56. In this case also, the central radial slot 65 increases the compliance of the support piece while minimizing concentration of stress in the base end of the support piece 58.

Figure 9:
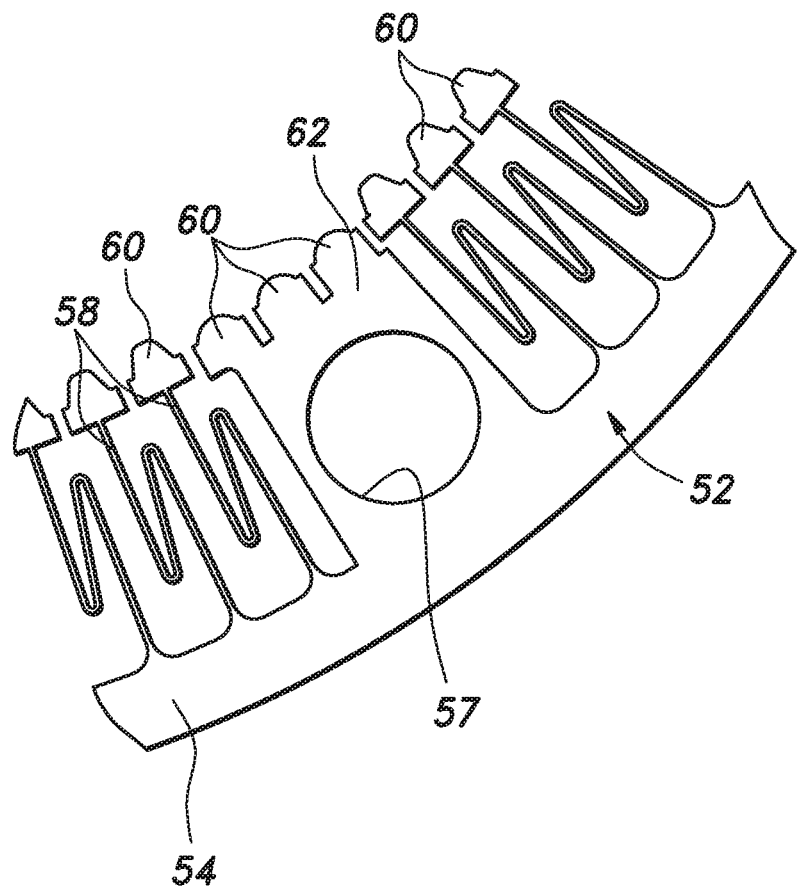
FIG. 9 is a view similar to FIG. 4 showing yet another alternate embodiment of the wobble removal gear.

In the preceding embodiments, the support pieces 58 extended linearly in the radial direction. However, the support pieces 58 may be bent in the major plane of the internal gear 14. In the embodiment illustrated in FIG. 9, each support piece 58 is bent in the shape of letter N, or in other words, is bent back twice in the radial direction as the support piece 58 extends radially from the inner periphery of the gear main body 54. According to this arrangement, each internal tooth 60 is compliant in both the radial direction and the circumferential direction. Thereby, removal of the wobbling motion of the external gear 18 can be accomplished in an even more favorable manner.

Figure 10:
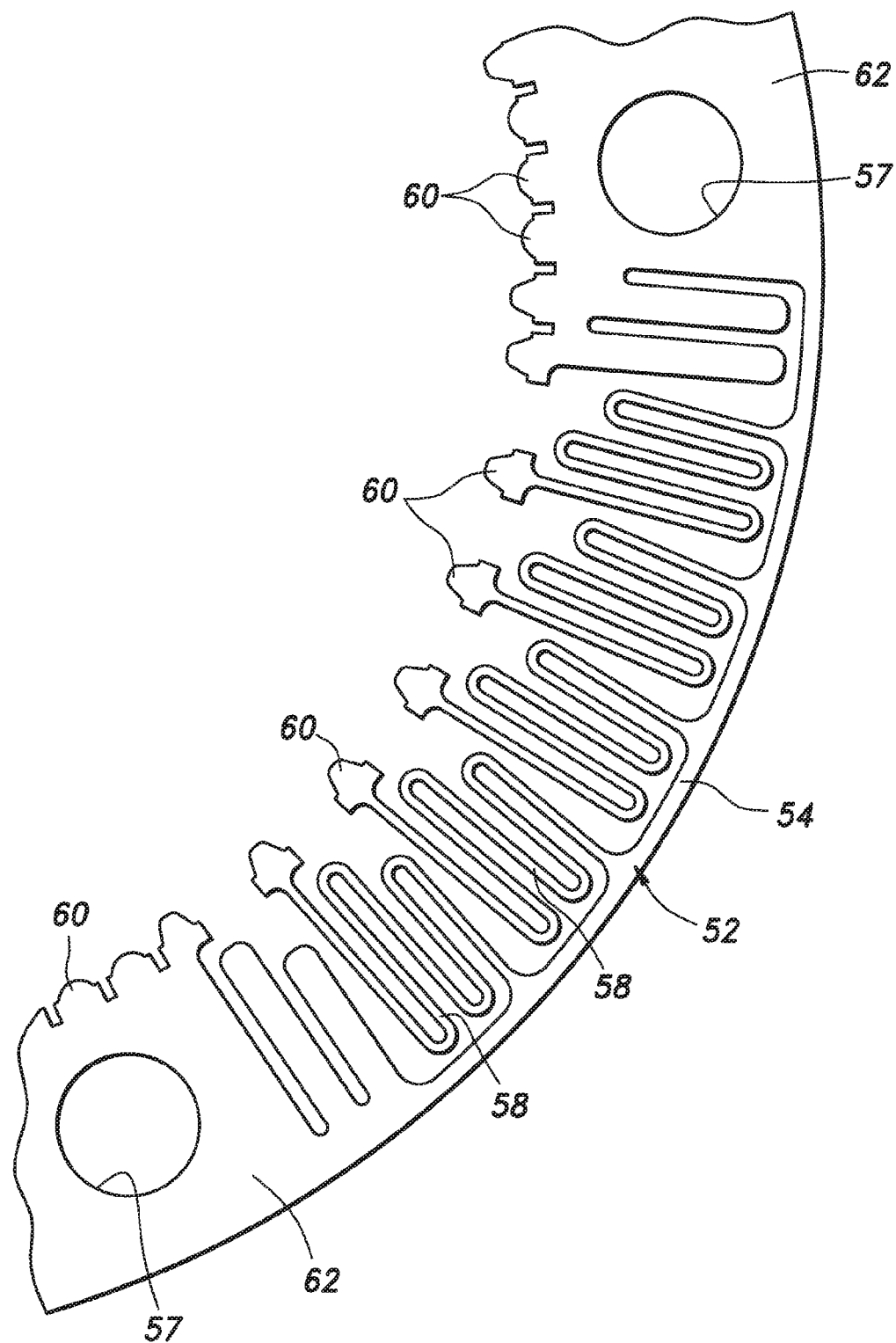
FIG. 10 is a view similar to FIG. 4 showing yet another alternate embodiment of the wobble removal gear.

In the embodiment illustrated in FIG. 10, each support piece 58 meanders in the radial direction, or in other words, is bent four times in the radial direction as it extends radially from the inner periphery of the gear main body 54. This increases the compliance of each internal tooth 60 even further.

Figure 11:
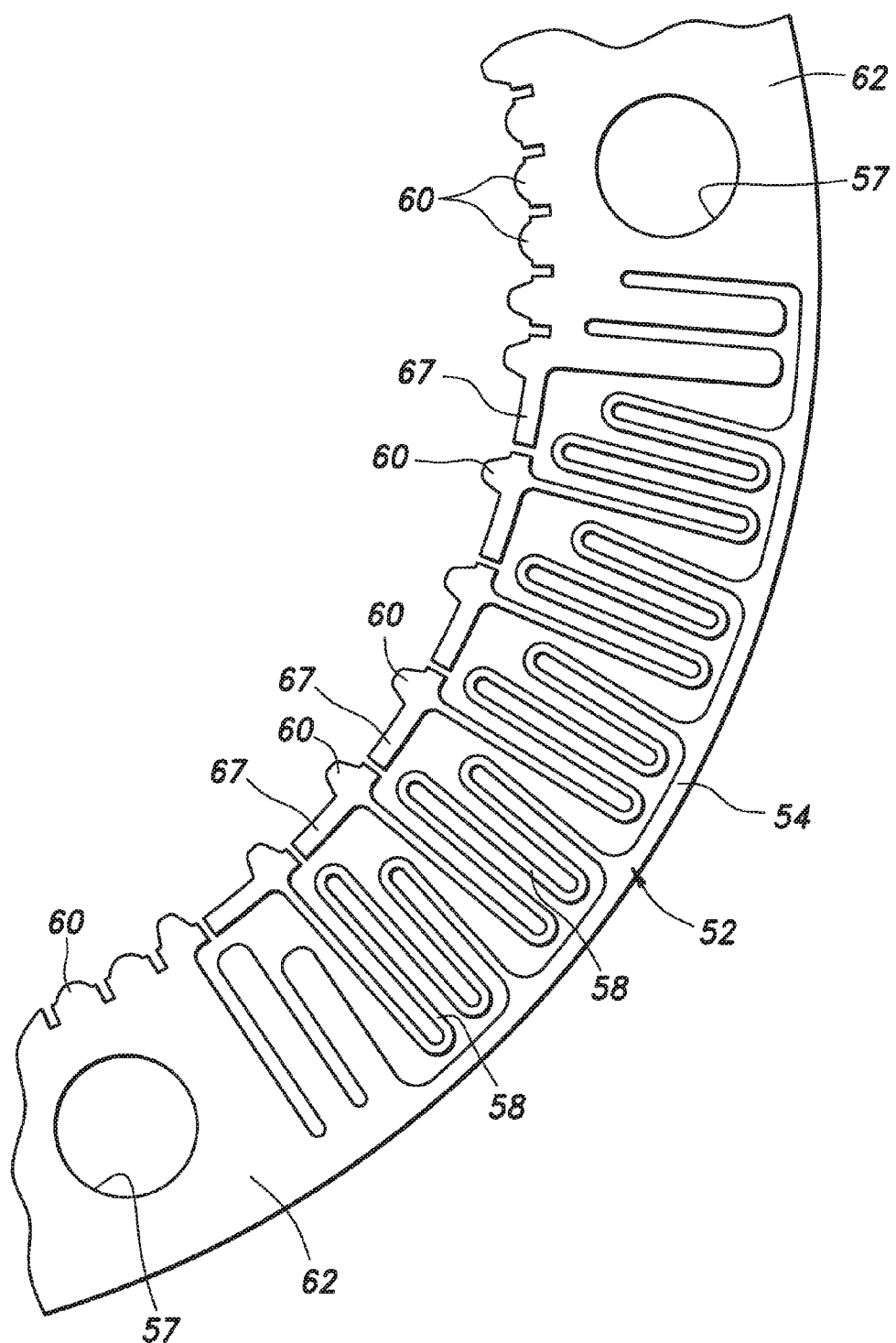
FIG. 11 is a view similar to FIG. 4 showing yet another alternate embodiment of the wobble removal gear.

To control the readily deformable range of each internal tooth 60, the internal tooth 60 may be provided with a circumferential extension 67 that opposes the adjacent internal tooth 60 or the circumferential extension 67 thereof at a small gap as shown in FIG. 11. This is particularly advantageous when the support pieces 58 meander in the radial direction as is the case with the embodiments illustrated in FIGS. 9 and 10.

The hypocycloid reduction gear device 10 of the present invention is provided with three elements, the input element (the input shaft 32 and the eccentric drive member 24), the fixed element (the fixed member 40 and the wobble removal gear 52) and the output element (the internal gear 14, the output member 34 and the output shaft 38). As is case with any planetary gear system, these elements are mutually interchangeable. For instance, the internal gear 14 may be used as the fixed element while the fixed member 40 is used as the output element. As can be readily appreciated by the person skilled in the art, the three elements can be interchanged as required without departing from the spirit of the present invention.

An alternate embodiment of the wobble removal shaft coupling and the hypocycloid reduction gear device is described in the following with reference to FIGS. 12 to 14. In the following description, the parts corresponding to those of the previous embodiments are denoted with like numerals without necessarily repeating the description of such parts.

The external gear 18 is coupled to the fixed member 40 via a wobble removal shaft coupling 70 such that the wobbling motion of the external gear 18 caused by the eccentric drive member 24 is permitted while the rotational angle of the external gear 18 is fixed relative to the fixed member 40. In this case also, the external gear 18 undergoes a translational wobbling motion in synchronism with the rotation of the input shaft 32.

Figure 13:
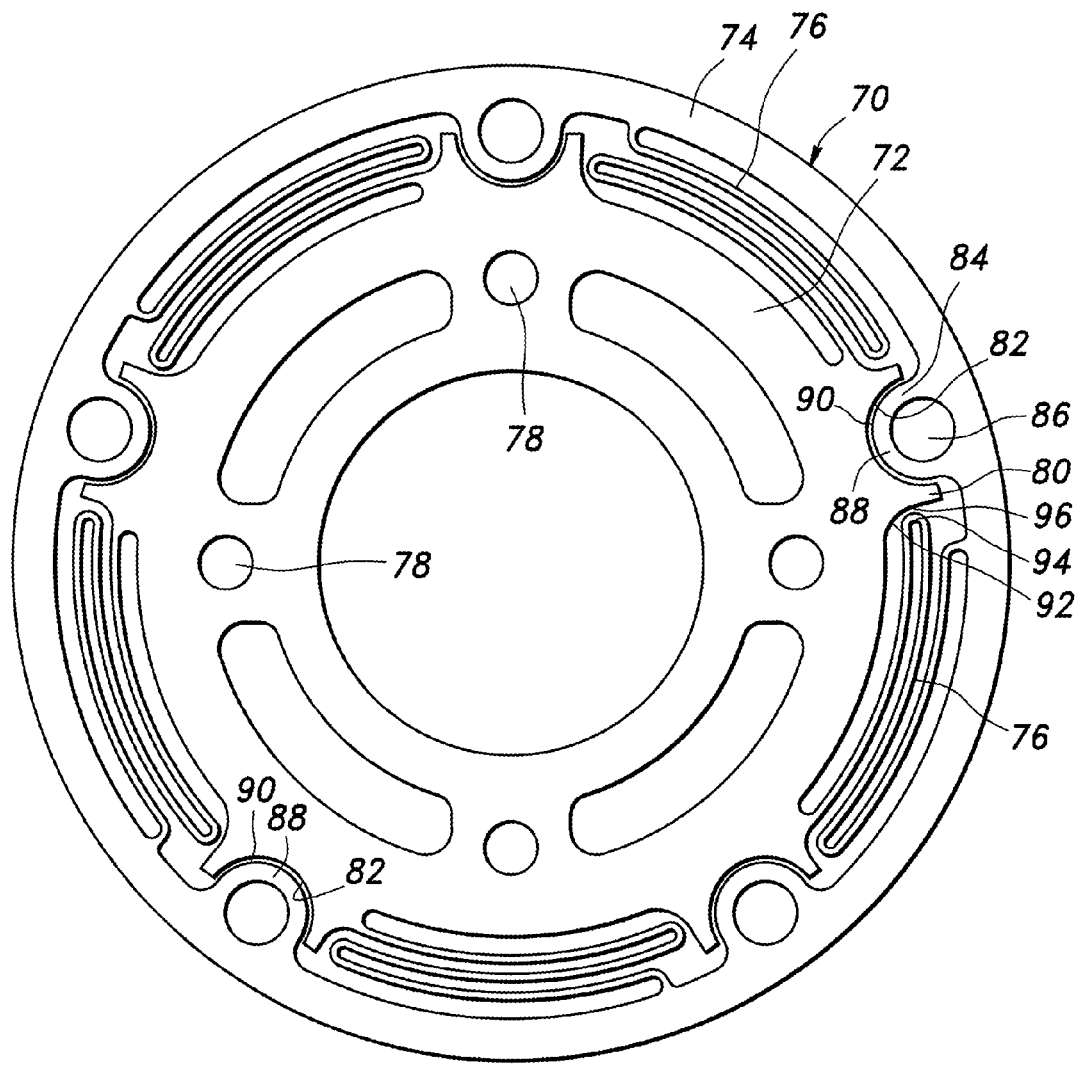
FIG. 13 is a front view of a wobble removal shaft coupling incorporated in the hypocycloid reduction gear device shown in FIG. 12 in a neutral state.
Figure 14:
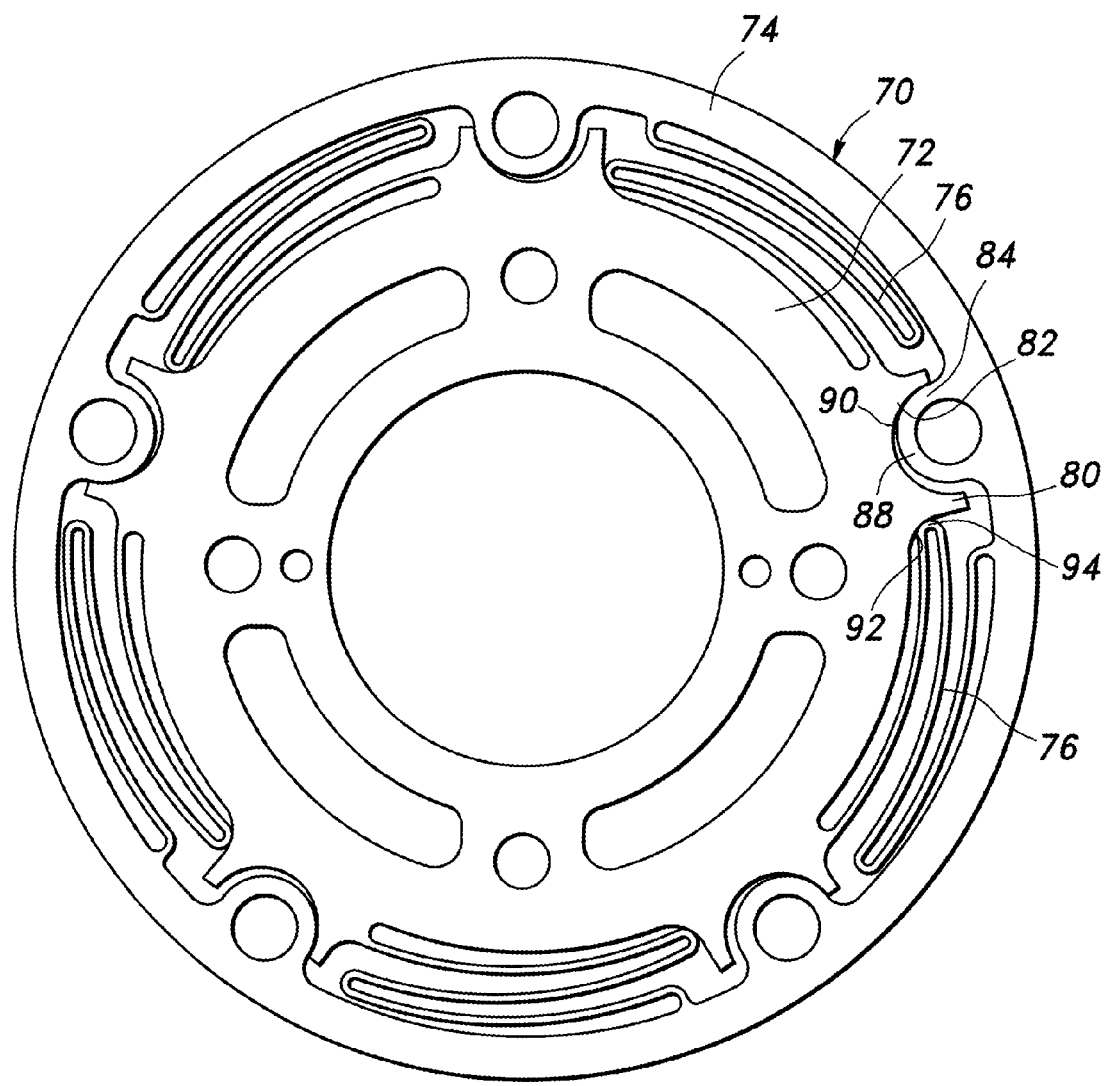
FIG. 14 is a view similar to FIG. 13 showing the wobble removal shaft coupling in a stressed state.

As shown in FIGS. 13 and 14, the wobble removal shaft coupling 70 includes an annular inner wheel 72 and an annular outer wheel 74 disposed substantially concentric to each other in the unstressed or neutral state shown in FIG. 13. The inner and outer wheels 72 and 74 are connected to each other by support pieces 76 meandering between the inner and outer wheels 72 and 74 in the circumferential direction at five locations arranged at a regular angular interval.

Thus, the inner wheel 72 is resiliently moveable both in the circumferential and radial directions relative to the outer wheel 74.

Figure 12:
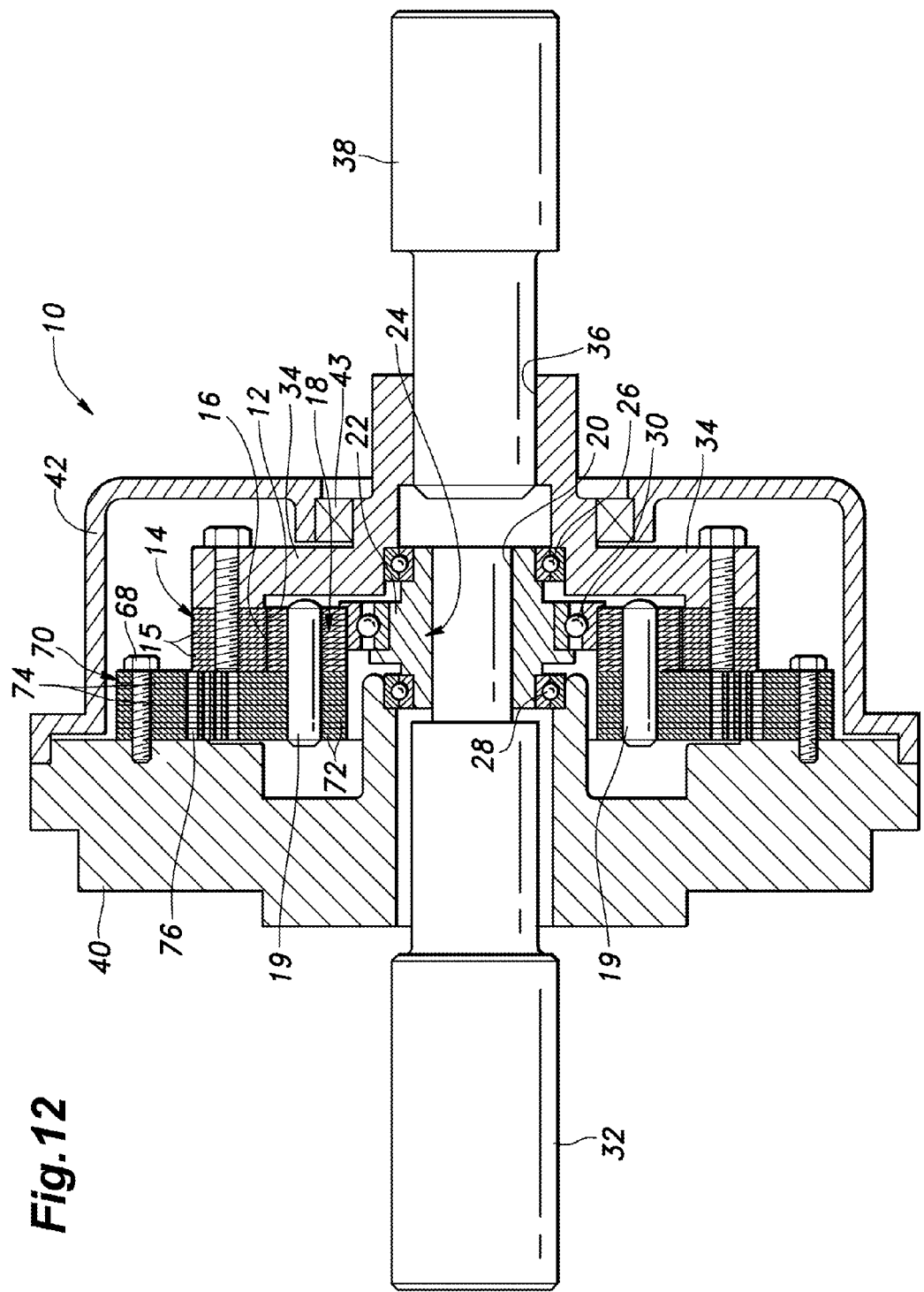
FIG. 12 is a view similar to FIG. 2 showing another embodiment of the hypocycloid reduction gear device.

The inner wheel 72 is provided with four mounting holes 78 at a regular angular interval so that the inner wheel 72 may be attached to an axial end surface of the external gear 18 by passing pins 19 or threaded bolts through these mounting holes 78 as shown in FIG. 12. The outer periphery of the inner wheel 72 is provided with five radial projections 80 each centrally defining a semicircular recess 82.

The inner periphery of the outer wheel 74 is formed with five semicircular radial projections 84 at a regular angular interval, each centrally defining a mounting hole 86. The outer wheel 74 is fixedly attached to an end surface of the fixed member 40 in a coaxial relationship by passing mounting bolts 68 through the mounting holes 86 as shown in FIG. 12.

The projections 84 are arranged so as to correspond to the respective recesses 82. In particular, the free end of each projection 84 is given with a semicircular profile 88 having a smaller radius than the corresponding recess 82 so that the semicircular profile 88 fits into the corresponding recess 82 in a complementary manner without contacting each other. In the initial state shown in FIG. 13, the semicircular profile 88 is received in the corresponding recess 82 in a concentric manner defining a small gap 90 between them. The size of the gap 90 is determined as a minimum value that is required for the wobbling movement of the external gear 18 caused by the rotational movement of the eccentric drive member 24 to be accommodated.

The corners in the base end of each projection 80 are each provided with a rounded profile 92 so as to avoid stress concentration, and a certain gap 96 is defined between each side of the projections 80 and the bent circumferential end 94 of the corresponding support piece 76 opposing thereto.

In this wobble removal shaft coupling 70, the inner wheel 72 is attached to the external gear 18, and the outer wheel 74 is attached to the fixed member 40 such that the external gear 18 is eccentrically offset relative to the internal gear 14. Thus, as shown in FIG. 14, the outer wheel 74 can be offset relative to the inner wheel 72, and this offsetting is limited by the abutment of the inner periphery of the recess 82 to the outer periphery of the semicircular profile 88. By this abutment, the external gear 18 is prevented from rotating relative to the fixed member 40. The point at which this abutment takes place moves along the arcuate edges of the recess 82 and the semicircular profile 88 constantly in synchronism with the wobbling motion of the external gear 18. Thus, the external gear 18 is prevented from rotating relative to the fixed member 40, but is allowed to wobble in synchronism with the rotation of the eccentric drive member 24.

In operation, the bent circumferential end 94 of each deformable support piece 76 may abut and move along the opposing side edge of the projection 80 in synchronism with the wobbling motion of the external gear 18. Each rounded profile 92 may be configured to achieve a smooth guide of the corresponding bent circumferential end 94.

In this case also, while the gap 90 is present, the inner wheel 72 can move relative to the outer wheel 74 with a high compliance, but once the gap 90 is closed, the relative movement between the inner wheel 72 and the outer wheel 74 is substantially prevented. Alternatively, the range of the compliant relative movement between the inner wheel 72 and the outer wheel 74 may be defined by the gap 96 defined between each side of the projections 80 and the bent circumferential end 94 of the corresponding support piece 76 opposing thereto.

As the eccentric drive member 24 is rotatively driven by the input shaft 32, the external gear 18 which is coupled to the fixed member 40 via the wobble removal shaft coupling 70 undergoes a wobbling motion without rotating relative to the fixed member 40. As there is a small difference in the number of gear teeth between the internal gear 14 and the external gear 18 which mesh with each other, the internal gear 14 rotates in the same direction as the input shaft 32 at a sharply reduced speed, and this rotation is transmitted to the output shaft 38 disposed coaxially to the input shaft 32 via the output member 34.

The wobble removal shaft coupling 70 accommodates the wobbling movement of the external gear 18 relative to the fixed member 40, and eliminates the need for a complex sliding shaft coupling such as an Oldham shaft coupling. The wobble removal shaft coupling 70 functions as a flexible coupling provided with a limiter that limits the relative angular displacement between the input and output ends thereof without requiring any complex arrangements so that the structure of the hypocycloid reduction gear device can be simplified with the added advantages of low cost and compact design.

In the illustrated embodiment, the wobble removal shaft coupling 70 is formed by laminating a plurality of laminates 53 which are produced from sheet metal by punching, and joining the laminates 53 by using mounting bolts. Therefore, the wobble removal shaft coupling 70 can be fabricated more efficiently and economically than by fabricating the wobble removal shaft coupling 70 by machining The hypocycloid reduction gear device 10 of the present invention is provided with three elements, the input element (the input shaft 32 and the eccentric drive member 24), the fixed element (the fixed member 40 and the outer wheel 74) and the output element (the internal gear 14, the output member 34 and the output shaft 38). In this case also, these elements are mutually interchangeable. For instance, the internal gear 14 may be used as the fixed element while the fixed member 40 is used as the output element. As can be readily appreciated by the person skilled in the art, the three elements can be interchanged as required without departing from the spirit of the present invention.

Figure 15:
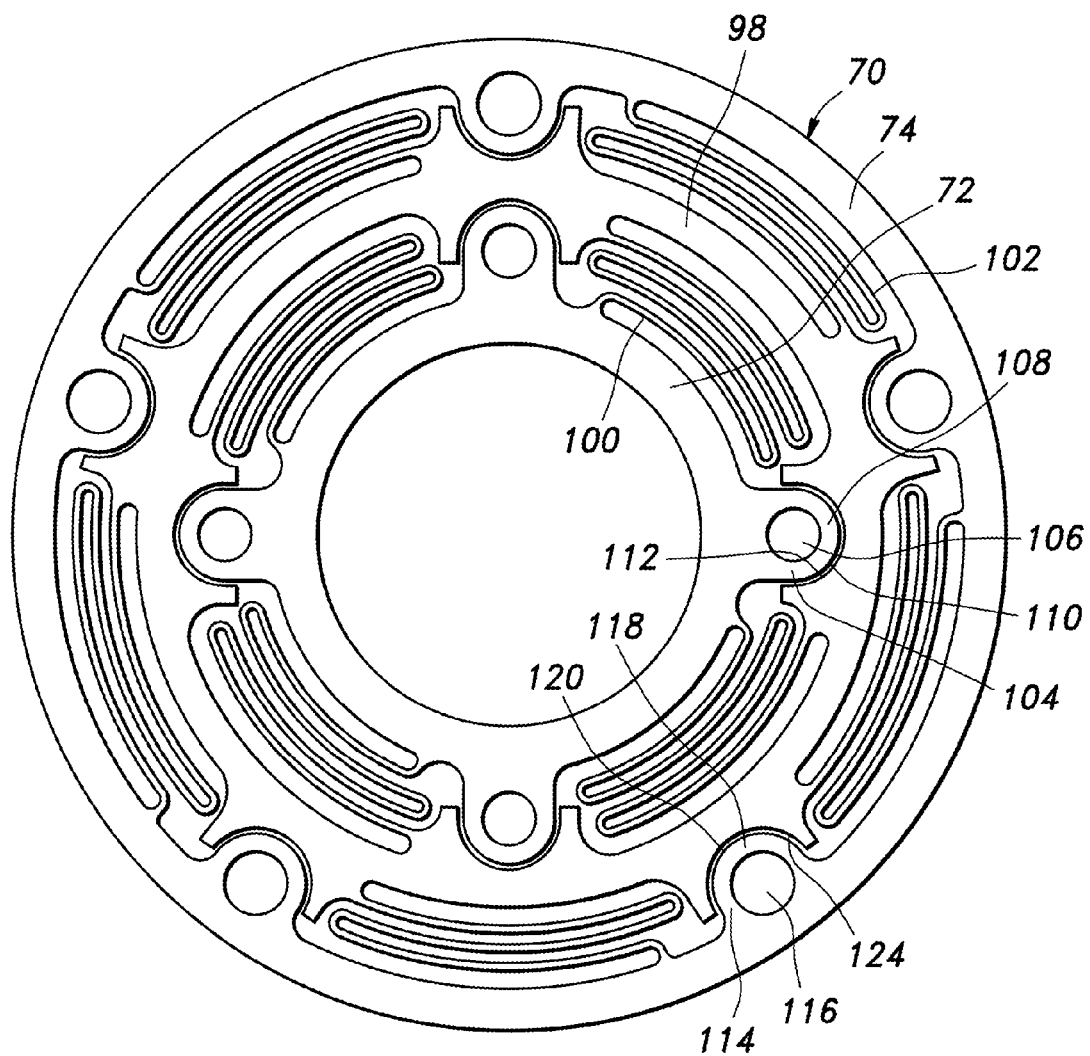
FIG. 15 is a view similar to FIG. 13 showing an alternate embodiment of the wobble removal shaft coupling in a neutral state.
Figure 16:
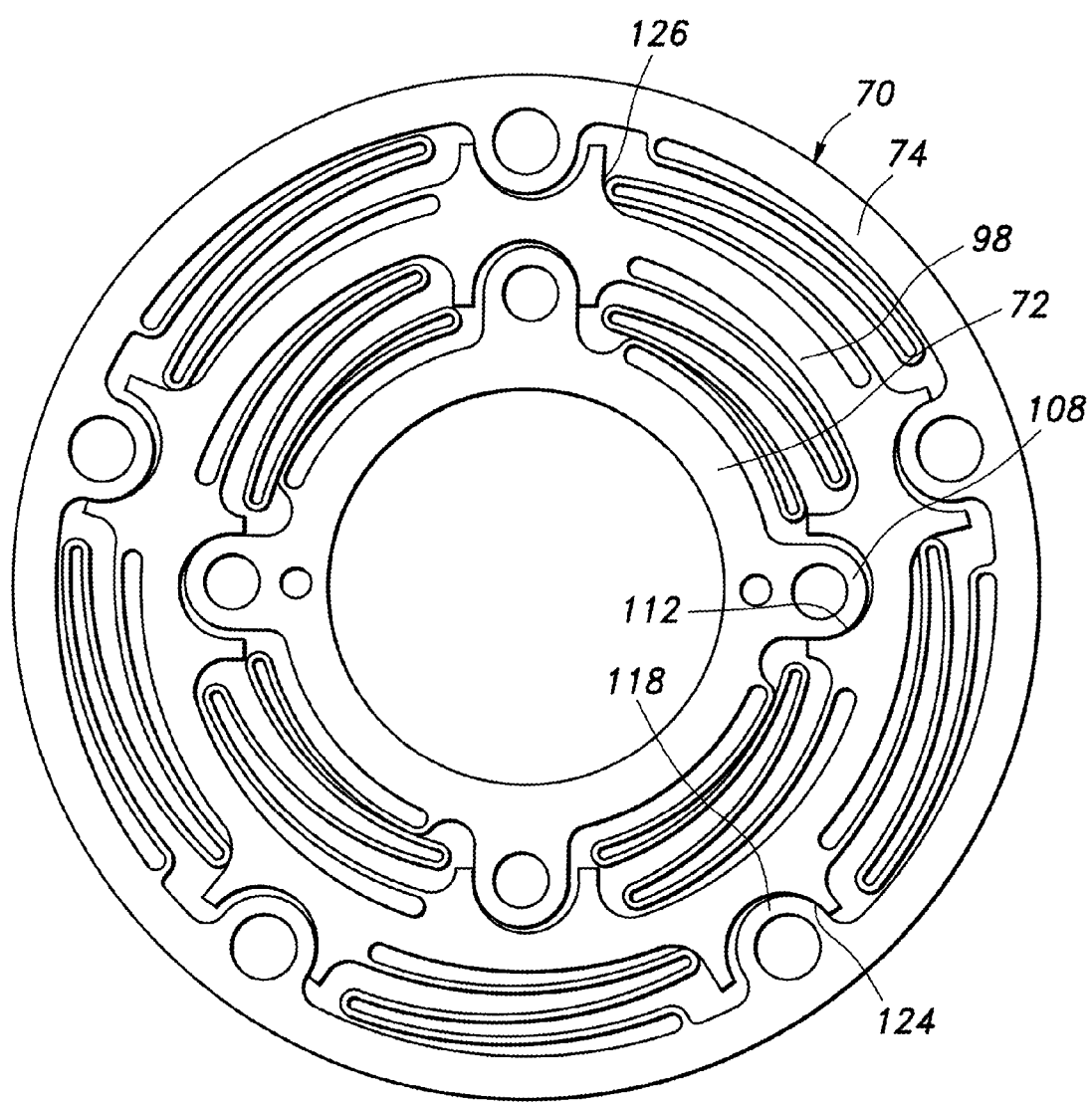
FIG. 16 is a view similar to FIG. 13 showing the wobble removal shaft coupling in a stressed state.

FIGS. 15 and 16 show an alternate embodiment of the wobble removal shaft coupling 70. In this embodiment, an intermediate wheel 98 is interposed between the inner wheel 72 and the outer wheel 74. In the neutral state illustrated in FIG. 15, the three wheels 72, 74 and 98 are disposed in a mutually concentric relationship.

The inner wheel 72 and the intermediate wheel 98 are connected to each other via a plurality of deformable support pieces 100 at a plurality (four in the illustrated embodiment) of locations, and the intermediate wheel 98 and the outer wheel 74 are connected to each other via a plurality of deformable support pieces 102 likewise at a plurality (four in the illustrated embodiment) of locations. These deformable support pieces 100 and 102 are each formed as a strip meandering in the circumferential direction.

The inner wheel 72 is provided with a plurality of projections 104 extending radially from the outer periphery thereof at a regular angular interval, and each projection 104 is centrally provided with a mounting hole 106. The inner wheel 72 is fixedly attached to an axial end surface of the external gear 18 by passing pins 19 through the mounting holes 106 as shown in FIG. 12. The free end of each projection 104 is provided with a semicircular profile 108. The inner periphery of the intermediate wheel 98 is formed with a plurality of semicircular recesses 112 each configured to complementarily receive the corresponding semicircular profile 108 at a prescribed gap 110.

The outer wheel 74 is provided with a plurality of projections 114 extending radially inward from the inner periphery thereof at a regular angular interval, and each projection 114 is formed with a mounting hole 116. The outer wheel 74 is fixedly attached to an axial end surface of the fixed member 40 in a coaxial arrangement by passing mounting bolts 68 through the mounting holes 116. The outer periphery of the intermediate wheel 98 is formed with a plurality of semicircular recesses 124 configured to complementarily receive a corresponding projection defined by the semicircular profile 118 at a prescribed gap 120. In this case also, while the gap 110, 120 is present, the inner wheel 72 can move relative to the outer wheel 74 with a high compliance, but once the gap 110, 120 is closed, the relative movement between the inner wheel 72 and the outer wheel 74 is substantially prevented.

Alternatively, an abutting portion 126 (FIG. 16) may be formed between each resiliently deformable support piece 102 and the opposing part of the outer wheel 74 to limit the range of a high compliance in the relative motion between the inner wheel 72 and the outer wheel 74.

In this wobble removal shaft coupling 70, the inner wheel 72 is attached to the external gear 18, and the outer wheel 74 is attached to the fixed member 40 such that the external gear 18 is eccentrically offset relative to the internal gear 14. Thus, as shown in FIG. 16, the outer wheel 74 can be offset relative to the inner wheel 72, and this offsetting is limited by the abutment of the inner periphery of the recess 112 to the outer periphery of the semicircular profile 108 and the abutment of inner periphery of the recess 124 to the outer periphery of the semicircular profile 118.

By these abutments, the external gear 18 is prevented from rotating relative to the fixed member 40. The points at which these abutments take place move along the arcuate edges of the recesses 112, 124 and the semicircular profiles 108, 118 constantly in synchronism with the wobbling motion of the external gear 18. Thus, the external gear 18 is prevented from rotating relative to the fixed member 40, but is allowed to wobble in synchronism with the rotation of the eccentric drive member 24.

Figure 17:
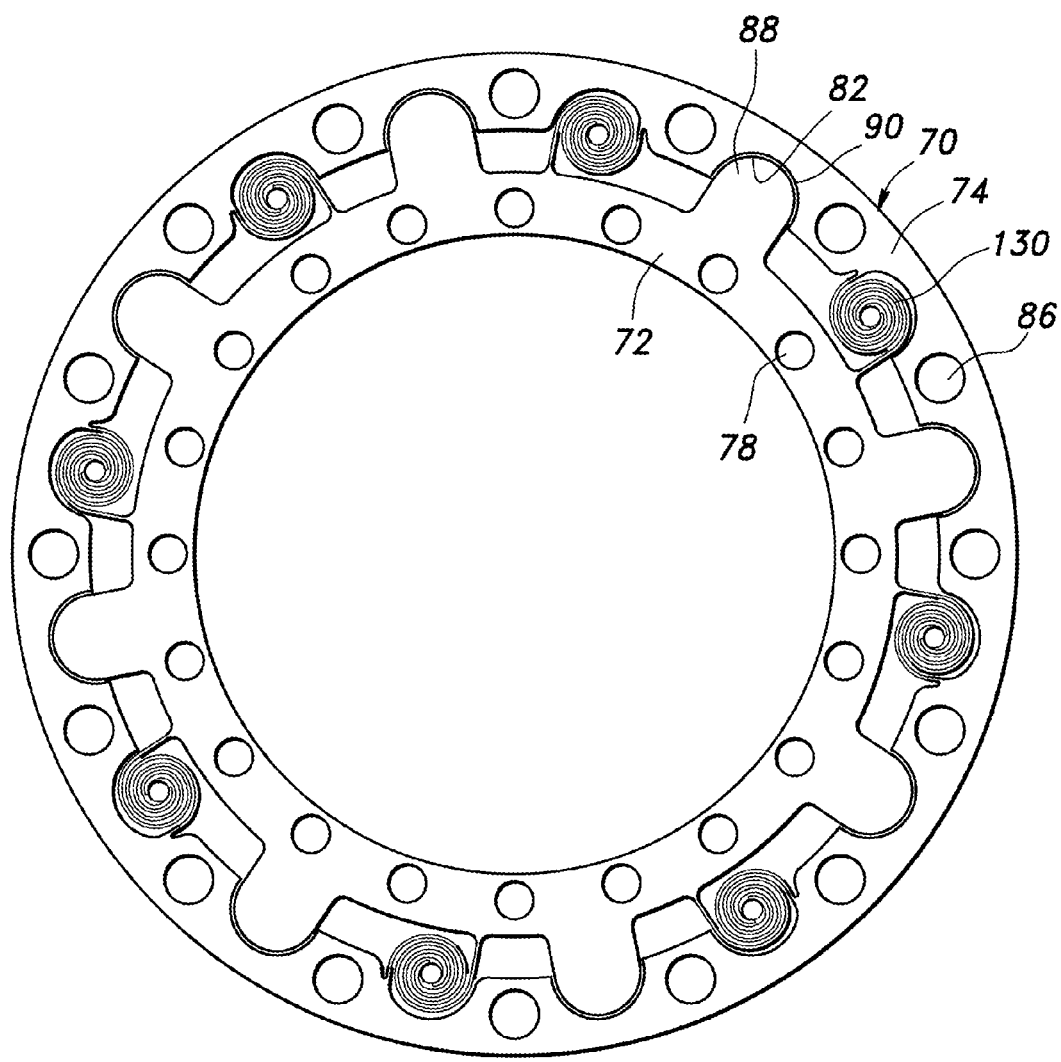
FIG. 17 is a view similar to FIG. 13 showing another alternate embodiment of the wobble removal shaft coupling in a neutral state.

FIG. 17 shows yet another modification of the wobble removal shaft coupling 70. In this case, the inner wheel 72 and the outer wheel 74 are connected to each other, at a plurality of locations, via spiral springs 130 extending in the same plane as the two wheels 72 and 74. This arrangement also allows relative radial and circumferential motion between the two wheels 72 and 74.

Although the present invention has been described in terms of specific embodiments, the present invention is not limited by such embodiments, and can be modified without departing from the spirit of the present invention. For instance, the external gear for the wobble removal shaft coupling 50 consisted of the axial extension of the external gear 18 of the hypocycloid reduction gear device 10 in the embodiment illustrated in FIG. 2, but may also be formed as a separate external gear. Furthermore, the external gear for the wobble removal shaft coupling 50 may have a different number of teeth and/or a different diameter from the external gear 18. Also, instead of or in addition to the internal teeth 60 of the wobble removal gear 52, the external teeth 16 of the external gear 18 may be resiliently supported by the gear main body (the hub) in the circumferential and/or radial direction.

The contents of the original Japanese patent application on which the Paris Convention priority claim is made for the present application as well as the contents of the prior art references mentioned in this application are incorporated in this application by reference.

The invention claimed is:

1. A hypocycloid reduction gear device, comprising:
a base member;
an internal gear having internal gear teeth along an inner circumference thereof, and supported by the base member so as to be rotatable around a first rotational center line;
an external gear having external gear teeth along an outer circumference thereof, the external gear teeth meshing with the internal gear teeth, and the external gear teeth being smaller in number than the internal gear teeth;
an eccentric drive member rotatably supported by the base member so as to be rotatable around the first rotational center line, and rotatably supporting the external gear so as to be rotatable around a second rotational center line extending in parallel with and offset from the first rotational center line and roll over the inner circumference of the internal gear; and
a wobble removal shaft coupling for resiliently coupling the external gear with the base member so as to maintain the external gear rotatively fixed relative to the base member while permitting an eccentric wobbling movement of the external gear relative to the base member;
the wobble removal shaft coupling, comprising:
a wobble removal gear having a set of wobble removal internal gear teeth along an inner circumference thereof and fixedly attached to the base member in a substantially concentric relationship to the internal gear, the wobble removal internal gear teeth meshing with the set of the external gear teeth, and the external gear teeth being identical in number to the wobble removal internal gear teeth of the wobble removal gear;
wherein the set of wobble removal internal gear teeth are resiliently deformable in a circumferential and/or radial direction.

2. The hypocycloid reduction gear device according to claim 1, wherein the resiliently deformable set of gear teeth are formed by laminating a plurality of laminates.

3. The hypocycloid reduction gear device according to claim 1, wherein the resiliently deformable gear teeth are separated from one another by a radial slit having a greater length than an effective height of the resiliently deformable gear teeth.

4. The hypocycloid reduction gear device according to claim 3, wherein each of the resiliently deformable gear teeth is provided with a central radial slot extending radially in a base end portion thereof.

5. The hypocycloid reduction gear device according to claim 4, wherein the central radial slot extends through a free end portion of the corresponding resiliently deformable gear tooth.

6. The hypocycloid reduction gear device according to claim 1, wherein the wobble removal gear includes:
an annular gear main body;
a plurality of cantilever support pieces each extending radially inward from an inner periphery of the gear main body and having a free end on which one of the wobble removal internal teeth is formed; and
a plurality of mounting pieces each extending radially inward from the inner periphery of the gear main body and having a larger circumferential dimension than the support pieces such that two or more of the wobble removal internal teeth are formed on a free end of each mounting piece and the wobble removal internal teeth formed on the free end of each mounting piece are truncated, each mounting piece having a mounting hole formed therein.

7. The hypocycloid reduction gear device according to claim 1, wherein each of the resiliently deformable gear teeth is provided with a free end portion configured as an effective gear tooth and a base portion which is substantially narrower than the free end portion.

8. The hypocycloid reduction gear device according to claim 1, wherein each resiliently deformable gear tooth includes a curved support piece extending between an effective gear tooth and a gear main body.

9. The hypocycloid reduction gear device according to claim 8, wherein each curved support piece meanders in the radial direction as it extends radially.

10. The hypocycloid reduction gear device according to claim 1, wherein each resiliently deformable gear tooth is provided with a circumferential extension opposing an adjacent gear tooth or a similar circumferential extension at a small gap.

11. A wobble removal shaft coupling, comprising:
an inner wheel;
an outer wheel disposed substantially concentric to the inner wheel; and
a resilient member connecting the inner wheel and the outer wheel to each other so as to be resiliently moveable in a circumferential and/or radial direction relative to each other;
wherein the resilient member includes a support piece extending between the inner wheel and the outer wheel in a circumferentially meandering fashion or in a spirally curved fashion; and
wherein the resilient member is formed integrally with the inner wheel and the outer wheel.

12. The wobble removal shaft coupling according to claim 11, wherein the inner wheel and the outer wheel are provided with abutting portions that limit relative movement between the inner wheel and the outer wheel beyond a prescribed limit.

13. The wobble removal shaft coupling according to claim 11, wherein the inner wheel, the outer wheel and the resilient member are formed by laminating a plurality of laminates each integrally provided with parts corresponding to the inner wheel, the outer wheel and the resilient member.

14. A hypocycloid reduction gear device comprising:
a base member;
an internal gear having internal gear teeth along an inner circumference thereof, and supported by the base member so as to be rotatable around a first rotational center line;
an external gear having external gear teeth along an outer circumference thereof, the external gear teeth meshing with the internal gear teeth, and the external gear teeth being smaller in number than the internal gear teeth;
an eccentric drive member rotatably supported by the base member so as to be rotatable around the first rotational center line, and rotatably supporting the external gear so as to be rotatable around a second rotational center line extending in parallel with and offset from the first rotational center line and roll over the inner circumference of the internal gear; and
a wobble removal shaft coupling for resiliently coupling the external gear with the base member so as to maintain the external gear rotatively fixed relative to the base member while permitting an eccentric wobbling movement of the external gear relative to the base member,
wherein the wobble removal shaft coupling, comprises:
an inner wheel fixedly attached to the external gear;
an outer wheel disposed substantially concentric to the inner wheel and fixedly attached to the base member; and
a resilient member connecting the inner wheel and the outer wheel to each other so as to be resiliently moveable in a circumferential and/or radial direction relative to each other;
wherein the resilient member includes a support piece extending between the inner wheel and the outer wheel in a circumferentially meandering fashion or in a spirally curved fashion.

* * * * *